(12) United States Patent
Puhala et al.

(10) Patent No.: US 7,462,391 B2
(45) Date of Patent: Dec. 9, 2008

(54) MULTI-LAYERED VENEER FOR A TIRE SIDEWALL

(75) Inventors: Aaron Scott Puhala, Kent, OH (US); Bruce Raymond Hahn, Hudson, OH (US); Junling Zhao, Hudson, OH (US); Tarah Pecora Shpargel, Solon, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 308 days.

(21) Appl. No.: 11/383,884

(22) Filed: May 17, 2006

(65) Prior Publication Data
US 2007/0267118 A1    Nov. 22, 2007

(51) Int. Cl.
*B32B 25/04* (2006.01)
*B32B 27/20* (2006.01)
*B32B 27/32* (2006.01)
*B32B 27/34* (2006.01)
*B60C 13/04* (2006.01)

(52) U.S. Cl. .............................. 428/355 EN; 428/195.1; 428/206; 428/343; 428/355 R; 428/355 BL; 428/474.4; 428/475.5; 428/475.8; 428/476.1; 428/476.3; 428/476.9; 428/500; 428/521; 428/523; 152/524; 152/525; 152/555; 152/DIG. 12

(58) Field of Classification Search .................. None
See application file for complete search history.

(56) References Cited

U.S. PATENT DOCUMENTS

| | | | |
|---|---|---|---|
| 3,725,330 A * | 4/1973 | Shirato et al. ............... 524/430 |
| 4,248,758 A * | 2/1981 | Wright ....................... 524/426 |
| 4,460,646 A * | 7/1984 | Inoue et al. ................. 428/344 |
| 5,058,647 A | 10/1991 | Gartland et al. | |
| 5,247,018 A * | 9/1993 | Maeda et al. ............... 525/193 |
| 5,300,164 A * | 4/1994 | DeTrano et al. ............. 156/116 |
| 5,364,688 A | 11/1994 | Mahn, Jr. | |
| 5,545,685 A * | 8/1996 | Davis et al. ................. 524/490 |
| 5,744,250 A * | 4/1998 | Lee et al. .................... 428/516 |
| 5,859,114 A * | 1/1999 | Davis et al. ................. 524/490 |
| 6,177,516 B1 * | 1/2001 | Hudak ........................ 525/71 |

(Continued)

FOREIGN PATENT DOCUMENTS

EP     0 608 175    *    7/1994

(Continued)

*Primary Examiner*—Vivian Chen
(74) *Attorney, Agent, or Firm*—Wood, Herron & Evans, L.L.P.

(57) ABSTRACT

A multi-layered veneer for a tire sidewall is disclosed wherein one or more layers of the veneer include at least one pigment to provide a desired visual effect for the tire sidewall. In one embodiment, the multi-layered veneer includes a tie layer and a first thermoplastic layer bonded to the tie layer. The tie layer is capable of bonding the veneer to a sidewall compound of a tire sidewall. The first thermoplastic layer includes a thermoplastic material and the tie layer includes no less than about 80% by weight of a synthetic polymer chosen from EPDM, EPR, polyethylene, or combinations thereof. The synthetic polymers have a Mooney Viscosity (ML 1+4 at 125° C.) from about 5 to about 40, and the EPDM and EPR have an ethylene content of about 70% by weight to about 99% by weight of the polymer. One or more pigments are dispersed in the tie layer and/or the first thermoplastic layer so as to provide the visual effect.

20 Claims, 3 Drawing Sheets

U.S. PATENT DOCUMENTS 6,217,982 B1 * 4/2001 Dawson ............... 428/151
6,279,633 B1    8/2001 Corvasce
6,431,236 B1    8/2002 Kanenari et al.
6,506,848 B2 * 1/2003 Hoenig et al. ......... 525/331.8
6,523,590 B2    2/2003 Meier et al.
6,777,498 B2 * 8/2004 Imai et al. ............ 525/191
7,078,104 B2 * 7/2006 Dunlap ............... 428/457
7,153,381 B2 * 12/2006 Majumdar et al. ...... 156/116
2003/0035922 A1 * 2/2003 Yu et al. ............... 428/122
2004/0253464 A1 * 12/2004 Krawinkel ............ 428/457
2006/0032569 A1    2/2006 Zimmer et al.

FOREIGN PATENT DOCUMENTS

| EP | 1 186 631 | * | 3/2002 |
| JP | 56-084950 | * | 7/1981 |
| JP | 2000-169824 | * | 6/2000 |

* cited by examiner

MULTI-LAYERED VENEER FOR A TIRE SIDEWALL

FIELD OF THE INVENTION

A multi-layered veneer for a tire sidewall wherein one or more layers of the veneer include at least one pigment to provide a desired visual effect for the sidewall.

BACKGROUND OF THE INVENTION

White and other colored sidewall tires are popular in the United States and Canada for providing a type of visual effect for the sidewall. Also, tires having decorative appliqués on the sidewalls thereof, such appliqués being cured in conjunction with the curing of the tire and including lettering, logos, and the like, are known. However, white sidewalls and current decorative appliqués, for example, include simple pigmentation, are limited to the use of opaque materials, and/or have a limited range of visual or aesthetic effects.

Painted-on designs have been proposed to replace the aforementioned decorative features. However, this option has not proven satisfactory largely due to the fact that painted-on designs are quite thin and can be easily damaged by scraping, scuffing and the like. Also, some of the same drawbacks are experienced as discussed above including a limited range of visual or aesthetic effects. Pre-molded sidewall appliqués, which can be applied to standard black wall tires have also been proposed. However, such procedures have not proven to be entirely satisfactory. For instance, difficulties have been encountered with maintaining adequate adhesion between the sidewall appliqué and the tire. Also, pre-molded appliqués, like the painted on-designs, can be easily damaged by scraping, scuffing, and the like. Current pre-molded appliqués, like the aforementioned decorative features, are understood to include simple pigmentation, to be limited to the use of opaque materials, and/or have a limited range of visual or aesthetic effects.

Thus, other decorative add-ons for a tire sidewall are desirable.

SUMMARY OF THE INVENTION

A multi-layered veneer for a tire sidewall wherein one or more layers of the veneer include at least one pigment to provide a desired visual effect for the sidewall is disclosed.

The multi-layered veneer includes a tie layer capable of bonding the veneer to a sidewall of a tire and a first thermoplastic layer bonded to the tie layer. The first thermoplastic layer includes one or more thermoplastic materials, such thermoplastic materials capable of being processed into films and providing stability and durability to the veneer. The tie layer includes a synthetic polymer chosen from EPDM (ethylene-propylene-diene polymer), EPR (ethylene-propylene polymer), polyethylene, or combinations thereof. The EPDM and EPR can include an ethylene content of from about 70% to about 99% by weight of the polymer. It should be understood that the polyethylene includes an ethylene content of 100% by weight. These synthetic polymers further include a Mooney Viscosity (ML 1+4 at 125° C.) from about 5 to about 40. The low Mooney viscosity and high ethylene content provide the synthetic polymers with desirable properties including a low viscosity in the melt state for film processing and effective bonding of the veneer to the tire sidewall. One or more pigments are dispersed in the tie layer and/or first thermoplastic layer to provide a visual effect. The type of synthetic polymers and thermoplastic materials used for forming each layer can be selected according to the desired level of transparency thereof. The desired level of transparency depends upon the desired visual effect for the multi-layered veneer.

In one example, the pigments of the multi-layered veneer are dispersed in the first thermoplastic layer. In yet another example, the pigments are dispersed in the tie layer. And, in still another example, the pigments are dispersed in both the first thermoplastic layer and tie layer. An optional adhesive coating that covers at least a portion of the tie layer opposite the first thermoplastic layer may be provided on the tie layer for adhering the veneer to the tire sidewall. The multi-layered veneer can also include one or more additional thermoplastic layers attached to the first thermoplastic layer. These additional thermoplastic layers, likewise, include one or more thermoplastic materials and, optionally, one or more pigments to provide enhanced visual effects for a tire sidewall. The tie layer may further include an additive, such as an adhesion promoter (e.g. maleated EPDM), to promote bonding of the first thermoplastic layer thereto. For purposes herein, it should be understood that pigment and additive are mutually exclusive.

In addition, the percent by weight of total synthetic polymer and thermoplastic material of each layer is based upon the amount of pigment and/or additive dispersed therein. Generally, the percent by weight additive and percent by weight pigment are each no greater than about 10% per layer. As such, the total percent by weight of synthetic polymer in the tie layer and the total percent by weight of thermoplastic material per thermoplastic layer should be no less than about 80%.

The multi-layered veneer of the present invention should include a total thickness of no more than about 3 millimeters. Such veneer can be applied to an uncured sidewall of a tire prior to putting the tire in the curing mold, or the veneer can be placed in a specific location in the curing mold prior to putting the uncured tire therein. Once the uncured tire is situated within the curing mold, the veneer, or portions thereof, may be pressed into the sidewall by means or methods known to those of ordinary skill in the art, such as by use of a sidewall plate, to form, for example, desired patterns, designs, lettering, and/or logos. The tire is subsequently cured so as to permanently affix the veneer to the sidewall. Certain areas of the veneer, e.g. the raised areas, may be removed, such as by grinding or buffing, leaving the inset portion of the veneer and providing a desired visual effect for the sidewall.

By virtue of the foregoing, there is thus provided a multi-layered veneer for a tire sidewall wherein one or more layers of the veneer include at least one pigment to provide a desired visual effect for the sidewall of a tire.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
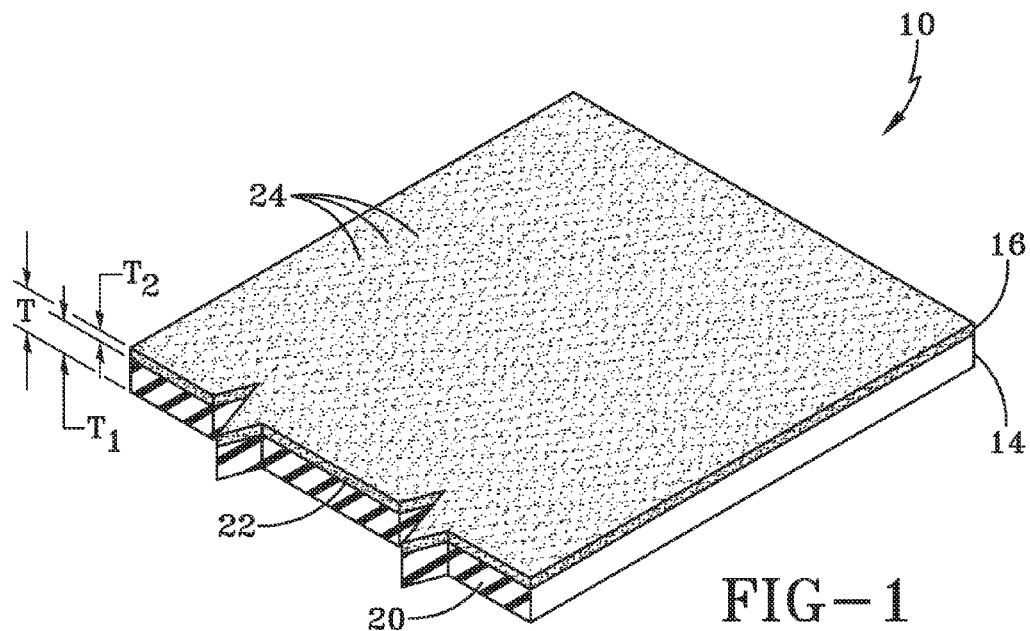
FIG. 1 is a cut-away perspective view of one embodiment of a multi-layered veneer.
Figure 4:
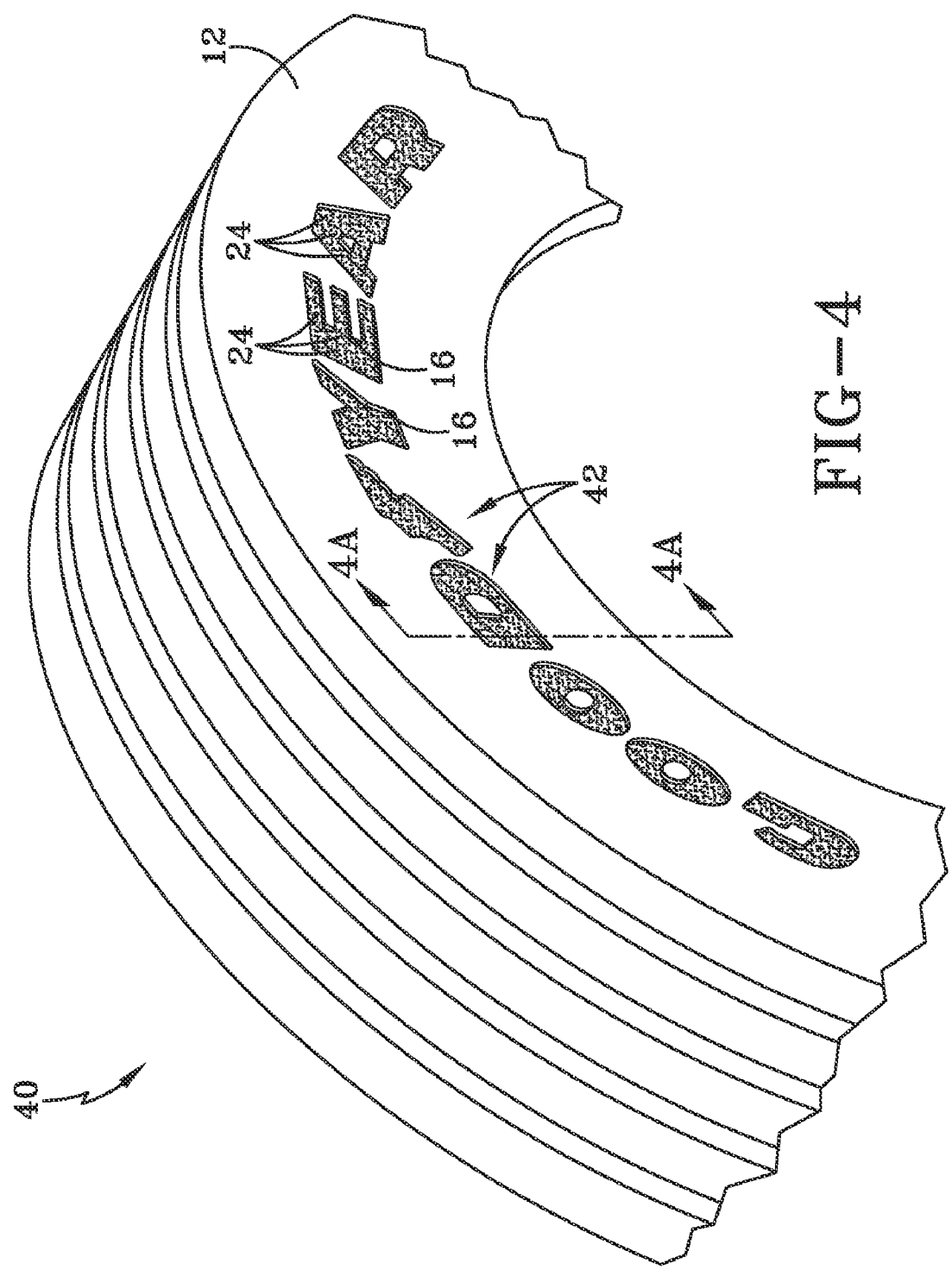
FIG. 4 is a perspective view of a section of a tire sidewall including the multi-layered veneer of FIG. 1.

FIG. 1 shows an embodiment of a multi-layered veneer 10 for a tire sidewall 12 (FIG. 4). The multi-layered veneer 10 includes a tie layer 14 capable of bonding the veneer 10 to tire sidewall 12 and further includes a first thermoplastic layer 16 bonded to the tie layer 14. In one embodiment, the tie layer 14 of FIG. 1 is composed of EPDM (ethylene-propylene-diene polymer) 20, which is a synthetic polymer. In another embodiment, the tie layer 14 is composed of either EPR (ethylene-propylene polymer) or polyethylene, which also are synthetic polymers. In another embodiment, the tie layer 14 includes combinations of EPDM, EPR, and/or polyethylene. In yet another embodiment, the EPDM, EPR, and/or polyethylene are transparent.

The EPDM 20 includes an ethylene content of from about 70% by weight to about 99% by weight of the polymer. In another embodiment, the ethylene content is about 75% by weight to about 85% by weight. In another embodiment, the ethylene content is about 80% by weight. When used in the tie layer 14, EPR should provide the same ranges of ethylene content. However, concerning polyethylene, it should be understood that polyethylene includes an ethylene content of 100% by weight polyethylene. The EPDM 20 also has a Mooney Viscosity (ML 1+4 at 125° C.) from about 5 to about 40. In another embodiment, the Mooney Viscosity (ML 1+4 at 125° C.) is about 10 to about 30. In another embodiment, the Mooney Viscosity (ML 1+4 at 125° C.) is about 20. The low Mooney Viscosity and high ethylene content provide EPDM 20 with desirable properties including a low viscosity in the melt state for film processing and effective bonding of the veneer 10 to the tire sidewall 12. Effective bonding is such that one would experience a cohesive failure of the veneer 10 when attempting to pull the veneer 10 off of sidewall 12. When used in the tie layer 14, the EPR and polyethylene, likewise, should provide the same ranges of Mooney Viscosity (ML 1+4 at 125° C.) as discussed above for the EPDM 20.

The first thermoplastic layer 16 is composed of a thermoplastic material 22, which provides stability and durability to the veneer 10. A pigment 24, e.g. an optically variable pigment, is situated in the thermoplastic material 22 to provide a visual effect. The first thermoplastic layer 16 may be composed of more than one thermoplastic material 22. The thermoplastic material 22 may include a polyamide, such as nylon (e.g. nylon 6,6, nylon 6, or nylon 12), polyethylene, polypropylene, a polyolefin, acrylics, poly(methyl methacrylate), polycarbonate, polystyrene, polyvinylchloride, styrene block copolymers, ionomers, and other thermoplastic materials and thermoplastic elastomers known to those of ordinary skill in the art. In one embodiment, the thermoplastic material(s) is transparent.

While the pigment 24 in FIG. 1 is shown as being generally evenly situated or dispersed throughout the thermoplastic material 22, the pigment 24 may be unevenly dispersed or simply situated in a single location. Other variations should be apparent to those skilled in the art. It should be further understood that more than one pigment 24 may be provided in the first thermoplastic layer 16. In one embodiment, one or more pigments 24 may be dispersed in the tie layer 14 rather than the first thermoplastic layer 16. In yet another embodiment, one or more pigments 24 may be dispersed in both the tie layer 14 and first thermoplastic layer 16.

The pigments 24 can be absorption (colored) pigments or special effects pigments, e.g. mica. The absorption pigments can be either inorganic or organic pigments. The organic pigment(s) may be chosen from carbonates, carbon, oxides, sulfides, sulfates, sulfoselenides, silicates, ferrocyanides, chromates, molybdates, metals, and/or synthetic mixed oxides. The inorganic pigment(s) may be chosen from phthalocyanine, a monoazo, diazo, polycyclic, and/or metal complex, as well as other absorption pigments known to those of ordinary skill in the art. One specific absorption pigment is Red 38™, which is a pyrazolone available from Akrochem of Akron, Ohio, while another is Blue 15™, which is a phthalocyanine also available from Akrochem of Akron, Ohio. The special effects pigments can include optically variable (color changing) pigments (e.g. Helicone® HC available from Wacker Chemie GmbH of Munich, Germany), dichroic pigments, pearlescent pigments (e.g. Silver White 1120G available from Kelly Chemical Corporation), iridescent pigments (e.g. Blue 2221G available from Kelly Chemical Corporation), reflective pigments (e.g., Silver Holographic flakes available from Siberline), thermochromic pigments (Red TCA69-Temp available from H.W. Sands Corp.), photochromic pigments (e.g. YL-10S available from Kelly Chemical Corporation), phosphorescent pigments (e.g. GSS305/1 available from United Mineral & Chemical Corp.), and/or laser-markable pigments (e.g. Iriodin® LS available from Merck Chemicals Ltd.), as well as other special effect pigments known to those of ordinary skill in the art. Multiple pigments 24 may be mixed according to methods known in the art to provide a variety of colors and/or effects.

The amount and types of pigment(s) 24 in the multi-layered veneer 10 may differ depending on the type of pigment 24, but may generally be an amount effective, as is known in the art, to provide the veneer 10 with the desired visual effect. Such desired effects, for example, can include pigmented patterns, e.g. a wood grain, marble, or swirl design, and the like, or may include text, images, etc. By way of example, the amount of total pigment in a layer, e.g. the first thermoplastic layer 16, can range from about 0.1% by weight to about 10% by weight.

The synthetic polymer(s) and thermoplastic material(s) used for forming layers 14, 16, and 30, 34, and 36 (See FIGS. 2 and 3) are selected according to the desired level of transparency for that layer 14, 16, 30, 34, 36. The desired level of transparency depends upon the desired visual effect for the multi-layered veneer 10, such visual effect being provided by the pigment 24. The level of transparency for the synthetic polymer and thermoplastic material may range from transparent to translucent to opaque. And, although certain layers are described herein, for example, as including a transparent synthetic polymer or thermoplastic material, it should be understood that the level of transparency may be varied. However, there are occasions when certain layers must be of a certain transparency for the pigment(s) 24 to be effective for providing a visual effect. For example, as would be understood by one skilled in the art, the third thermoplastic layer 36 of FIG. 3 must not be opaque, otherwise, the pigment 24 in the first thermoplastic layer 16 and second thermoplastic layer 34 could not provide a visual effect.

The synthetic polymer, e.g. EPDM 20, of the tie layer 14 may further include one or more additives (not illustrated), such as to promote bonding of the first thermoplastic 16 layer thereto. The additive is exclusive of pigment 24 and can include, for example, an adhesion promoter, such as amine functionalized polymers, epoxy functionalized polymers, or maleated polymers (e.g. maleated EPDM), and amide, ester, ether, styrene, ethylene, propylene and octane containing block copolymers, as well as crosslinking agents (e.g. sulfur or peroxide) to crosslink the tie layer 14. The total additive typically is present in a concentration ranging from about 0.1% by weight to about 10% by weight of the tie layer 14. The additive generally is included in the tie layer 14 when better adhesion of the thermoplastic layer 16 thereto is desired, such as when the thermoplastic material 22 includes a nylon. One or more additives may also be added to the thermoplastic layer 16, as is known in the art, to provide desired properties.

The percent by weight of total synthetic polymer, e.g. EPDM 20, and thermoplastic material 22, is typically based upon the amount of pigment 24 and/or additive dispersed therein. Generally, the percent by weight additive and percent by weight pigment are each no greater than about 10% per layer 14, 16 as indicated above. In addition, the total percent by weight of synthetic polymer, such as EPDM 20, in the tie layer 14 and total percent by weight of thermoplastic material 22 in the first thermoplastic layer 16 should be no less than about 80%. Consequently, when the tie layer 14 is devoid of pigment 24 or additive, the tie layer 14 typically includes no less than about 90% by weight of synthetic polymer. And, when the tie layer 14 is devoid of both additive and pigment 24, the tie layer 14 is 100% by weight synthetic polymer. By way of example, the tie layer 14 of FIG. 1 is devoid of both additive and pigment 24 and, thus, is 100% EPDM 20.

The thickness ($T_1$) of the tie layer 14 can range from about 2 mils to about 100 mils. In another embodiment, the thickness ($T_1$) of the tie layer 14 can range from about 5 mils to about 50 mils. In another embodiment, the thickness ($T_1$) of the tie layer 14 can range from about 5 mils to about 10 mils. The thickness ($T_2$) of the first thermoplastic layer 16 may range from about 0.5 mils to about 5 mils. In another embodiment, thickness ($T_2$) of the first thermoplastic layer 16 can range from about 0.5 mils to about 2 mils. In another embodiment, the thickness ($T_2$) of the first thermoplastic layer 16 is about 1 mil. The total thickness (T) of the multi-layered veneer 10, regardless of the number of layers 14, 16, 30, 34, 36, 38 (See FIGS. 1-3), should be no more than about 3 mm. In addition, for simplicity, the multi-layered veneer 10 is illustrated as being generally rectangular. However, it should be understood that the veneer 10 could be of other shapes and sizes.

Figure 2:
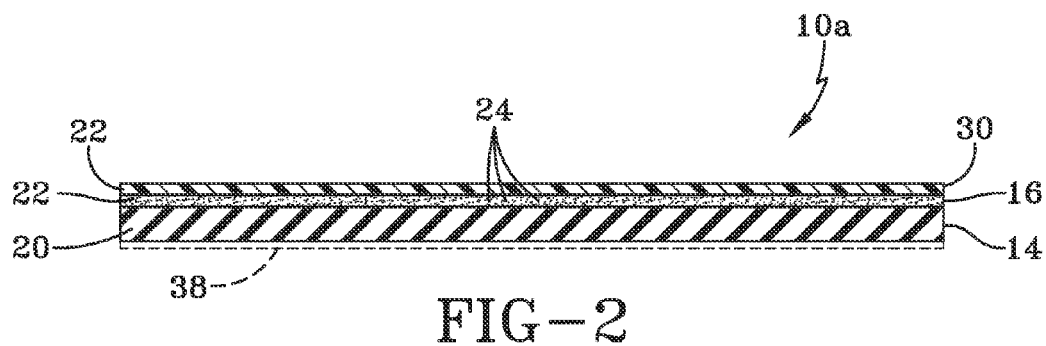
FIG. 2 is a cross-sectional view of another embodiment of a multi-layered veneer.

FIG. 2 shows another embodiment of a multi-layered veneer 10a. In this embodiment, a second thermoplastic layer 30 is bonded to first thermoplastic layer 16 so that the first thermoplastic layer 16 is situated intermediate the second thermoplastic layer 30 and tie layer 14. The second thermoplastic layer 30 includes one or more transparent or translucent thermoplastic materials 22, as described above, and provides additional stability and durability to the veneer 10a while also adding visual depth.

As further shown in FIG. 2, the multi-layered veneer 10a also optionally includes an adhesive coating 38 (represented by dashed lines) which covers a portion of the tie layer 14 opposite the first thermoplastic layer 16 such that the tie layer 14 is situated intermediate the adhesive coating 38 and first thermoplastic layer 16. The coating 38 includes a conjugated diene polymer, such as natural or synthetic polyisoprene, styrene-butadiene rubber (SBR), polybutadiene rubber, acrylic elastomers, and others known to those skilled in the art, as well as appropriate cross-linking agents (e.g. sulfur). The conjugated diene polymer provides a desired level of tack or adhesion so that the coating layer 38 can effectively bond the veneer 10a to tire sidewall 12. It should be understood that the adhesive coating 38 may optionally be applied to the tie layer 14 of FIG. 1 and FIG. 3.

Figure 3:
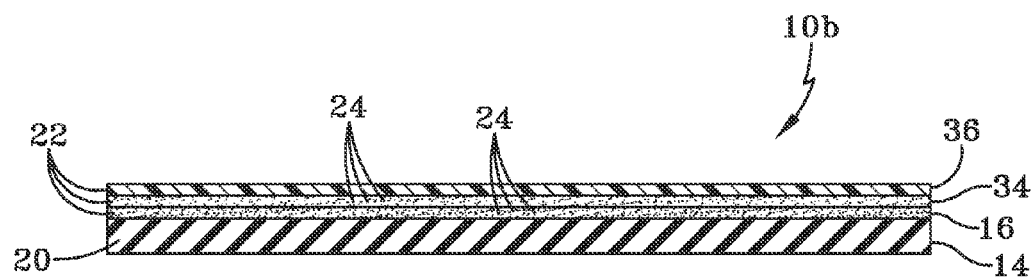
FIG. 3 is a cross-sectional view of yet another embodiment of a multi-layered veneer

FIG. 3 shows yet another embodiment of a multi-layered veneer 10b. In this embodiment, second and third thermoplastic layers 34 and 36 are further provided. The second thermoplastic layer 34 is bonded to first thermoplastic layer 16 so that the first thermoplastic layer 16 is situated intermediate the second thermoplastic layer 34 and tie layer 14 while the third thermoplastic layer 36 is bonded to the second thermoplastic layer 34 so that the second thermoplastic layer 34 is situated intermediate the first and third thermoplastic layers 16, 36. The second and third thermoplastic layers 34, 36, include one or more transparent or translucent thermoplastic materials 22. In addition, the second and third thermoplastic layers 34, 36 provide additional stability and durability to the veneer while the third thermoplastic layer 36 further adds visual depth. Also, one or more pigments 24 may be further dispersed in the second thermoplastic layer 34 to provide, in combination with the pigment 24 of the first layer 16, an enhanced visual effect. In one embodiment, the third thermoplastic layer 36 is removed, i.e. is optional.

With further reference to FIGS. 1-4A, each layer 14, 16, 30, 34, 36 of the multi-layered veneer 10, 10a, 10b is formed or processed by methods known in the art, such as via multi-layered film forming equipment or casting machines (not shown). During formation of the multi-layered veneer 10, 10a, 10b, the tie layer 14 and thermoplastic layers 16, 30, 34, 36 generally are naturally adhesive for bonding therebetween insofar as the layers 16, 30, 34, 36 are layered at elevated temperatures. As discussed above, an additive, such as an adhesion promoter, may be added to promote bonding. If the optional adhesive coating 38 is desired, the conjugated diene polymer may be provided in solution, as known to those of ordinary skill in the art, and coated or calendared onto the tie layer 14 whereby the solvent (e.g. hexane or cyclohexane) evaporates, thus, leaving coating 38. The pre-formed veneer 10, 10a, 10b then may be applied to an uncured sidewall 12 of a tire 40 as further discussed below. With respect to the sidewall 12, the sidewall compound should be composed of a non-staining compound, such non-staining compound typically including butyl rubber and/or EPDM to avoid discoloration of the veneer and, thus, detracting from the visual effect thereof. The tire sidewall 12 and the tire 40 itself are prepared by methods well known to those of ordinary skill in the art.

Figure 4A:
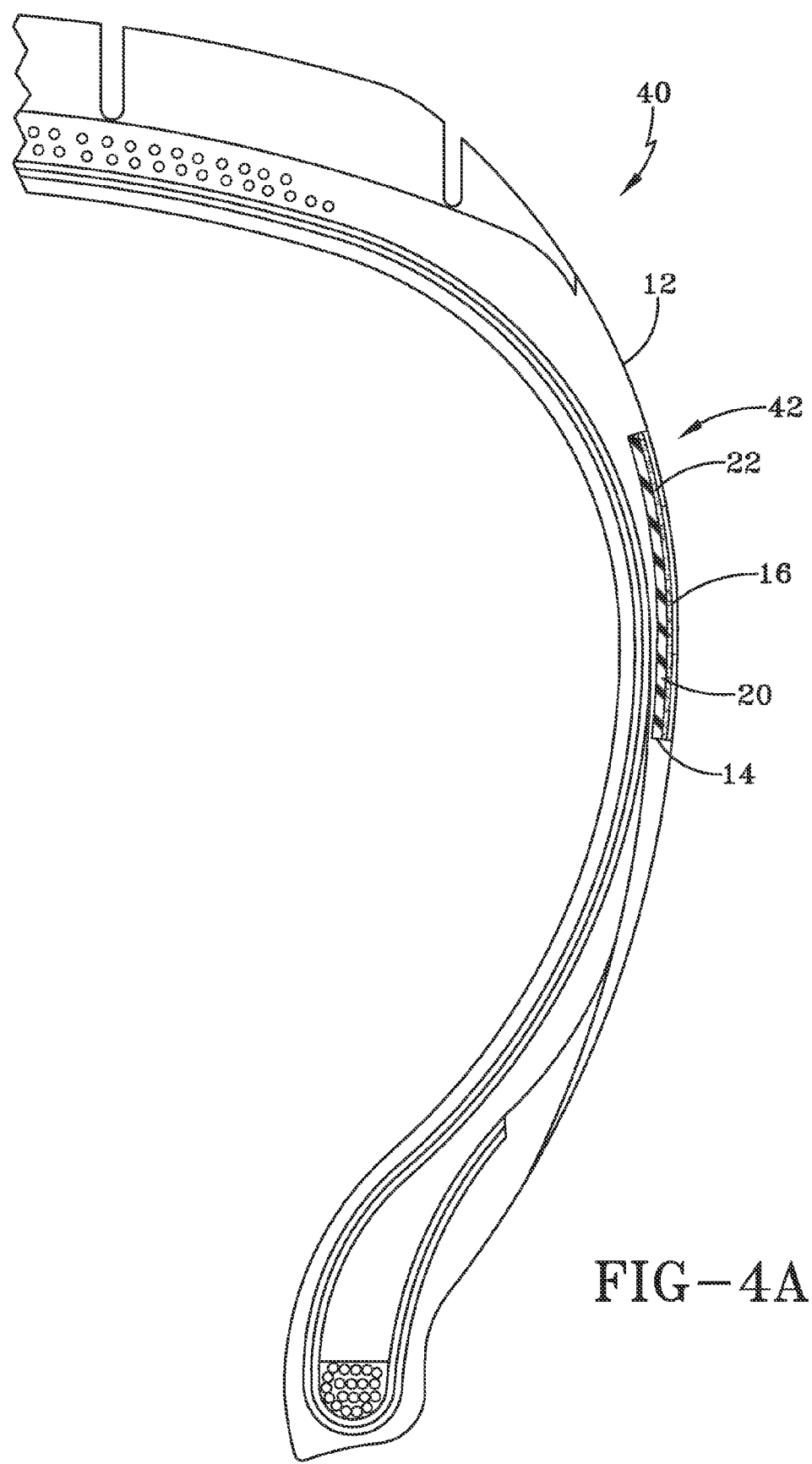
FIG. 4A is a cross-sectional view of the section of tire of FIG. 4 taken along lines 4A-4A.

As further shown in FIGS. 4 and 4A, portions 42 of the multi-layered veneer 10 of FIG. 1 are situated, i.e. inset, in the sidewall 12 with the tie layer 14 being bonded thereto. The pre-formed multi-layered veneer 10 may be applied to the sidewall 12 prior to putting the tire 40 in a curing mold (not shown) or the veneer 10 can be placed in a specific location in the curing mold prior to putting an uncured tire (not shown) therein, such location being adapted for retaining, or holding, the veneer 10. Once the uncured tire is situated in the curing mold, the veneer 10 is applied to the sidewall 12 and, more specifically, portions 42 are pressed into the sidewall 12 by means or methods known to those of ordinary skill in the art, e.g., by using a sidewall plate (not shown), with the tire being subsequently cured to permanently affix the tie layer 14 of the veneer 10 to the sidewall 12. Heat may optionally be applied during application of the veneer 10 to the sidewall 12 to further promote bonding of the veneer 10 thereto. The raised areas (not shown) of the veneer 10 are completely removed, such as by grinding or buffing, leaving the "GOODYEAR" lettering (and logo) portions 42 with the pigment 24 in the first thermoplastic layer 16 providing the desired visual effect for the sidewall 12. It should be understood by one of ordinary skill in the art that each portion 42 defines a multi-layered veneer. Other examples will be appreciated by one of ordinary skill in the art.

Non-limiting examples of multi-layered veneers 10, 10a, 10b for use on tire sidewalls 12 in accordance with the description are now disclosed below.

EXAMPLE I

In a first example and with reference to FIG. 1, the multi-layered veneer 10 includes tie layer 14 and first thermoplastic layer 16 bonded to the tie layer 14. The tie layer 14 is 98% by weight Nordel™ 4820P available from Dow of Freeport, Tex. and 2% by weight Royaltuf® 498, which is an additive (not illustrated) available from Chemtura Corporation of Middlebury, Conn. Nordel™ 4820 is a commercially available pelletized EPDM 20, which includes 80% by weight ethylene and 4% by weight diene component and has a Mooney Viscosity (ML1+4 at 125° C.) of 20. Royaltuf® 498 is a commercially available pelletized maleated EPDM. The first thermoplastic layer 16 is 98% by weight Zytel®, which is Nylon 6 available from DuPont of Wilmington, Del., and 2% by weight Helicone® HC, which is an optically variable pigment 24 available from Wacker Chemie GmbH of Munich, Germany. The tie layer 14 is about 10 mils thick and the first thermoplastic layer 16 is about 1 mil thick for a total thickness (T) of about 11 mils.

Each layer 14, 16 is prepared by methods known in the art, such as by heating and mixing together of the respective components, such layers 14, 16 then being co-extruded together using, for example, multi-layer film forming equipment well known in the art. The pre-formed veneer 10 then is applied to an uncured sidewall of a green tire, such sidewall 12 (FIG. 4) being composed of a non-staining compound. More specifically, the pre-formed multi-layered veneer 10 is applied, or bonded, to the uncured tire in the area of the sidewall 12 where the visual effect is desired, with portions 42 being pressed into the sidewall 12 by means or methods known to those of ordinary skill in the art. The tire 40 (FIG. 4) then is cured by methods well known in the art. Accordingly, the veneer 10 is permanently affixed to the tire sidewall 12. Finally, unwanted areas, i.e. raised areas (not shown), of veneer 10 are removed, such as by being buffed off, from the veneer 10 leaving only portions 42 (FIG. 4) so that a subject may view the decorative Goodyear lettering and logo on sidewall 12.

EXAMPLE II

In this example and with reference to FIG. 2, the multi-layered veneer 10a includes second thermoplastic layer 30, which is bonded to first thermoplastic layer 16 so that the first thermoplastic layer 16 is situated intermediate the second thermoplastic layer 30 and tie layer 14. The first thermoplastic layer 16 and tie layer 14 are identical to those in Example I above. The second thermoplastic layer 30 is 100% by weight Zytel®, i.e. Nylon 6. The second thermoplastic layer 30 is about 1 mil thick for a total veneer thickness of about 12 mils and further provides additional stability and durability to the veneer while also adding visual depth. The adhesive coating 38 is optionally excluded from this Example.

Each layer 14, 16, 30 is prepared and co-extruded together as described above in Example I. Likewise, the pre-formed multi-layered veneer 10a can be bonded to non-staining sidewall 12 (FIG. 4) of an uncured tire, which subsequently is cured with the decorative veneer 10a becoming affixed thereto and portions 42 (FIG. 4) being inset in sidewall 12. Finally, unwanted areas of the veneer 10a may be removed as desired, such as is discussed in Example I above. Accordingly, the decorative Goodyear lettering and logo on sidewall 12 provides a desired visual effect for the sidewall 12.

EXAMPLE III

In this example and with reference to FIG. 3, the multi-layered veneer 10b includes second and third thermoplastic layers 34, 36. Accordingly, the second thermoplastic layer 34 is bonded to the first thermoplastic layer 16 so that first thermoplastic layer 16 is situated intermediate the second thermoplastic layer 34 and tie layer 14 while the third thermoplastic layer 36 is bonded to the second thermoplastic layer 34 so that the second thermoplastic layer 34 is situated intermediate the first and third thermoplastic layers 16, 36. The tie layer 14 is identical to Example I above. The first thermoplastic layer 16 is 96% by weight Zytel®, i.e. Nylon 6, 2% by weight Red 38™ 24, which is a pyrazolone available from Akrochem of Akron, Ohio, and 2% by weight White 6™ 24, which is a titanium dioxide also available from Akrochem of Akron, Ohio. The second thermoplastic layer 34 is 98% by weight Zytel®, i.e. Nylon 6, and 2% by weight Helicone® HC, i.e. an optically variable pigment 24. The third thermoplastic layer 36 is 100% by weight Zytel®, i.e. Nylon 6.

The second and third thermoplastic layers 34, 36 are each about 1 mil thick for a total veneer thickness of about 13 mils. The second and third thermoplastic layers 34, 36 provide additional stability and durability to the veneer 10b while the third thermoplastic layer 36 further adds visual depth. The pigment 24 dispersed in the second thermoplastic layer 34 provides, in combination with the pigment 24 of the first layer 16, a veneer 10b having an enhanced visual effect for use on tire sidewall 12 (FIG. 4).

Each layer 14, 16, 34, 36 again is prepared and co-extruded together as discussed above in Example I. The pre-formed multi-layered veneer 10b, likewise, may be applied to non-staining sidewall 12 of an uncured tire, which subsequently is cured with the decorative veneer 10b becoming affixed thereto and portions 42 (FIG. 4) being inset in sidewall 12. Finally, unwanted areas of the veneer 10b may be removed as desired, such as is discussed in Example I. Accordingly, as with Examples I and II above, the Goodyear lettering and logo provides a desired visual effect for sidewall 12.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope of the general inventive concept.

What is claimed is:

1. A multi-layered veneer for a tire sidewall comprising:
   a tie layer comprising no less than about 80% by weight of a synthetic polymer selected from the group consisting of ethylene-propylene-diene polymer (EPDM), ethylene-propylene polymer (EPR), polyethylene, and combinations thereof, the polymer having a Mooney Viscosity (ML 1+4 at 125° C.) from about 5 to about 40, the EPDM and EPR further comprising an ethylene content from about 70% by weight to about 99% by weight of the polymer, and the tie layer capable of being bonded to a tire sidewall;

a first thermoplastic layer bonded to the tie layer, the thermoplastic layer comprising a thermoplastic material, and at least one pigment dispersed in the first thermoplastic layer to provide a visual effect for the tire sidewall.

2. The multi-layered veneer of claim 1 wherein the tie layer comprises no less than about 90% by weight of the synthetic polymer.

3. The multi-layered veneer of claim 2 wherein the tie layer further comprises an additive to promote bonding of the thermoplastic layer to the tie layer.

4. The multi-layered veneer of claim 3 wherein the synthetic polymer is EPDM, the additive is maleated EPDM, and the thermoplastic material is a nylon.

5. The multi-layered veneer of claim 1 further comprising an adhesive coating which covers at least a portion of the tie layer wherein the tie layer is situated intermediate the coating and first thermoplastic layer, the coating comprising a conjugated diene polymer and capable of being bonded to the tire sidewall.

6. The multi-layered veneer of claim 1 wherein the pigment comprises first and second pigments dispersed in the first thermoplastic layer.

7. The multi-layered veneer of claim 1 further comprising a second thermoplastic layer bonded to the first thermoplastic layer so that the first thermoplastic layer is situated intermediate the second thermoplastic layer and tie layer, the second thermoplastic layer comprising a thermoplastic material, the pigment dispersed in the first thermoplastic layer, and the tie layer comprising no less than about 90% by weight of the synthetic polymer.

8. The multi-layered veneer of claim 7 wherein the pigment comprises first and second pigments, the first pigment dispersed in the first thermoplastic layer and the second pigment dispersed in the second thermoplastic layer.

9. The multi-layered veneer of claim 7 wherein the tie layer further comprises an additive to promote bonding of the first thermoplastic layer to the tie layer.

10. The multi-layered veneer of claim 9 wherein the synthetic polymer is EPDM, the additive is maleated EPDM, and the thermoplastic material of the first and second thermoplastic layers is a nylon.

11. The multi-layered veneer of claim 1 further comprising second and third thermoplastic layers, the second thermoplastic layer bonded to the first thermoplastic layer so that the first thermoplastic layer is situated intermediate the second thermoplastic layer and tie layer, the third thermoplastic layer bonded to the second thermoplastic layer so that the second thermoplastic layer is situated intermediate the first and third thermoplastic layers, the second and third thermoplastic layers comprising thermoplastic materials, the pigment comprising first and second pigments, the first pigment dispersed in the first thermoplastic layer and the second pigment dispersed in the second thermoplastic layer, and the tie layer comprising no less than about 90% by weight of the synthetic polymer.

12. The multi-layered veneer of claim 11 wherein the tie layer further comprises an additive to promote bonding of the first thermoplastic layer to the tie layer.

13. The multi-layered veneer of claim 12 wherein the synthetic polymer is EPDM, the additive is maleated EPDM, and the thermoplastic material of the first, second, and third thermoplastic layers is a nylon.

14. The multi-layered veneer of claim 1 wherein the total thickness of the veneer is no more than about 3 mm.

15. A tire comprising at least a portion of the multi-layered veneer of claim 1.

16. A tire comprising:

a tire tread and first and second sidewalls, at least one of the first or second sidewalls comprising a portion defining a multi-layered veneer for providing a visual effect for the sidewall, the multi-layered veneer comprising:

a tie layer comprising no less than about 80% by weight of a synthetic polymer selected from the group consisting of ethylene-propylene-diene polymer (EPDM), ethylene-propylene polymer (EPR), polyethylene, and combinations thereof, the polymer having a Mooney Viscosity (ML 1+4 at 125° C.) from about 5 to about 40, the EPDM and EPR further comprising an ethylene content of from about 70% by weight to about 99% by weight of the polymer, and the tie layer bonded to the sidewall of the tire;

a first thermoplastic layer bonded to the tie layer, the thermoplastic layer comprising a thermoplastic material, and at least one pigment, the pigment dispersed in at least one of the tie layer or first thermoplastic layer to provide the visual effect for the sidewall.

17. The tire of claim 16 wherein the pigment is dispersed in the first thermoplastic layer.

18. The tire of claim 16 wherein the pigment is dispersed in the tie layer.

19. The tire of claim 16 wherein the multi-layered veneer further comprises an adhesive coating which covers at least a portion of the tie layer wherein the tie layer is situated intermediate the coating and first thermoplastic layer, the coating comprising a conjugated diene polymer and bonded to the sidewall of the tire.

20. The multi-layered veneer of claim 16 wherein the total thickness of the veneer is no more than about 3 mm.

* * * * *